(12) United States Patent
Blendermann et al.

(10) Patent No.: US 6,789,161 B1
(45) Date of Patent: *Sep. 7, 2004

(54) METHOD FOR CONTROLLING REUTILIZATION OF DATA SPACE IN VIRTUAL TAPE SYSTEM

(75) Inventors: Stephen H. Blendermann, Boulder, CO (US); Alan Ray Sutton, Boulder, CO (US)

(73) Assignee: Storage Technology Corporation, Louisville, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 721 days.

(21) Appl. No.: 09/121,254

(22) Filed: Jul. 23, 1998

Related U.S. Application Data

(63) Continuation-in-part of application No. 09/110,217, filed on Jul. 6, 1998, now Pat. No. 6,094,605.

(51) Int. Cl.$^7$ ............................................. G06F 12/00
(52) U.S. Cl. ...................................... 711/111; 707/206
(58) Field of Search .................... 711/111, 112; 360/60; 380/3, 4; 707/205, 206, 9; 713/189, 193

(56) References Cited

U.S. PATENT DOCUMENTS 5,265,159 A * 11/1993 Kung ............................ 380/4
6,088,720 A * 7/2000 Berkowitz et al. .......... 709/206
6,137,864 A * 10/2000 Yaker ....................... 379/88.22
6,185,474 B1 * 2/2001 Nakamura et al. .......... 700/121

OTHER PUBLICATIONS a.Microsoft Windows 95 Resource Kit. (Redmond, Washington: Microsoft Press, 1995) p. 655., 1995.*

DFSMS/MVS V1R2 Access Method Services for VSAM, [Online] http://www.s390.ibm.com/bookmgr-cgi/bookmgr.cmd/BOOKS/DGT1V402/CCONTENTS?SHELF=EZ239701, Oct. 1995.*

Shoppa, T. "Re: Q: how to delete files permanently?" [Online] news://comp.os.vms, May 5, 1999.*

* cited by examiner

*Primary Examiner*—Matthew Kim
*Assistant Examiner*—Woo H. Choi
(74) *Attorney, Agent, or Firm*—Brooks Kushman P.C.

(57) ABSTRACT

A method for selectively controlling reutilization of data space in a virtual tape system is provided which allows a user to designate whether data from a scratched virtual volume can be automatically deleted without any further action on the part of the user. This allows a user to selectively choose to create a safety net by which expired data could still be retrieved if so desired, while also minimizing the impact of such a safety net feature on the overall efficiency in space management otherwise provided by the virtual tape system.

5 Claims, 2 Drawing Sheets

US 6,789,161 B1

METHOD FOR CONTROLLING REUTILIZATION OF DATA SPACE IN VIRTUAL TAPE SYSTEM

CROSS-REFERENCE TO RELATED APPLICATIONS

This application is a continuation-in-part of U.S. application Ser. No. 09/110,217, filed on Jul. 6, 1998, now U.S. Pat. No. 6,094,605.

TECHNICAL FIELD

The present invention relates generally to a virtual tape data storage arrangement, and more particularly to an improved method for selectively controlling reutilization of space occupied by expired data.

BACKGROUND ART

Generally, automated cartridge systems (ACS) provide a mechanism by which multiple users in a data processing system can have common access to multiple data storage subsystems such as magnetic tape cartridge devices. In conventional tape systems, data files generated by remote user computer systems for storage on a particular tape cartridge include a predetermined expiration date in the file meta data which is used as a control mechanism by which a tape management subsystem can determine whether a particular space on a tape can be rewritten with new data. However, in conventional tape systems, expired data from a "scratched" tape volume is not actually deleted from the tape until a user actually writes new data to the tape. In other words, conventional tape systems conveniently provide a "safety net" for users who decide they still wish to be able to retrieve data from storage even though the data may be past the original expiration date.

Because conventional tape systems have proven to be quite inefficient in data storage space utilization, a virtual tape system has been developed which significantly improves storage space utilization and control by incorporating the advantages of an intermediate disk buffer as part of a tape emulation arrangement. Such an arrangement is taught in commonly owned copending U.S. patent application Ser. No. 09/110,217, filed on Jul. 6, 1998, now U.S. Pat. No. 6,094,605 and incorporated by reference herein.

More specifically, in the referenced virtual tape system, a disk buffer is connected between remote users and the tape storage devices and arranged to appear to users as though it were a physical tape device. All data volumes are initially stored in the disk buffer, and subsequently written to a physical tape device using predetermined protocols which limit the occurrence of unusable dead spaces on the tapes while also improving the ability to reclaim any fragmented space which does occur. In such a virtual tape system, a user reads and writes only to the disk buffer, but believes they are reading and writing to an actual physical tape device.

While efficiency in space management and utilization are significantly improved with the virtual tape system, users also lose the above-noted safety net feature inherently provided by conventional tape systems. More specifically, to achieve higher efficiency, the virtual tape system operates to automatically reutilize any tape and disk buffer space occupied by expired data without user action, i.e., a user does not have exclusive monopoly of a particular tape like in a conventional tape system because the tape can be reused any time a new data volume is received into the disk buffer. Emulating the safety net feature in the virtual tape system would involve prohibiting the reuse of any tape space until a user reuses a corresponding virtual tape volume name for the data volume stored in the space irrespective of whether the corresponding data has expired.

However, such an arrangement reintroduces significant inefficiency in storage space utilization and reclamation, thereby defeating a main advantage of the virtual tape system. As a result, a need exists for an improved method of controlling reutilization of data space in a virtual tape system which can provide a safety net for users while also minimizing the impact of such a feature on efficiency of data storage space utilization and management.

DISCLOSURE OF THE INVENTION

It is therefore an object of the present invention to provide an improved method for controlling reutilization of data space in a virtual tape system which allows a user to control whether space occupied by expired data can be automatically reused by a tape management system.

It is another object of the present invention to provide a method for controlling reutilization of data space in a virtual tape system which allows selective reuse of physical storage space occupied by a scratched virtual volume without waiting until a user actually reuses the virtual volume.

In accordance with these and other objects, the present invention provides a method for controlling reutilization of data space in a virtual tape system which allows a user to designate whether a particular data volume can be automatically deleted at the time of expiration without waiting for the user to actually reuse the virtual volume.

In accordance with one aspect of the present invention, a method is provided for selectively controlling reutilization of data space in a virtual tape system which includes selectively designating by a remote user whether a particular data volume file can be automatically deleted by the virtual tape system without any further action by the user after a predetermined expiration date for the data volume file has elapsed, detecting whether a data volume file has been designated by the user for automatic deletion, and prohibiting deletion from the virtual tape system of the stored data corresponding to a data volume based on whether the data volume file was designated by the user for automatic deletion. In accordance with another aspect, a predetermined grace period can be provided before automatic deletion is performed.

With such an arrangement, the present invention can allow a user to selectively "protect" data past an original expiration date, while also allowing automatic reutilization of storage space for data which has not been specifically protected by the user.

These and other objects, features, and advantages of the present invention will be readily apparent from the following detailed description of the best mode for carrying out the invention when taken in connection with the accompanying drawings.

BEST MODE FOR CARRYING OUT THE INVENTION

Figure 1:
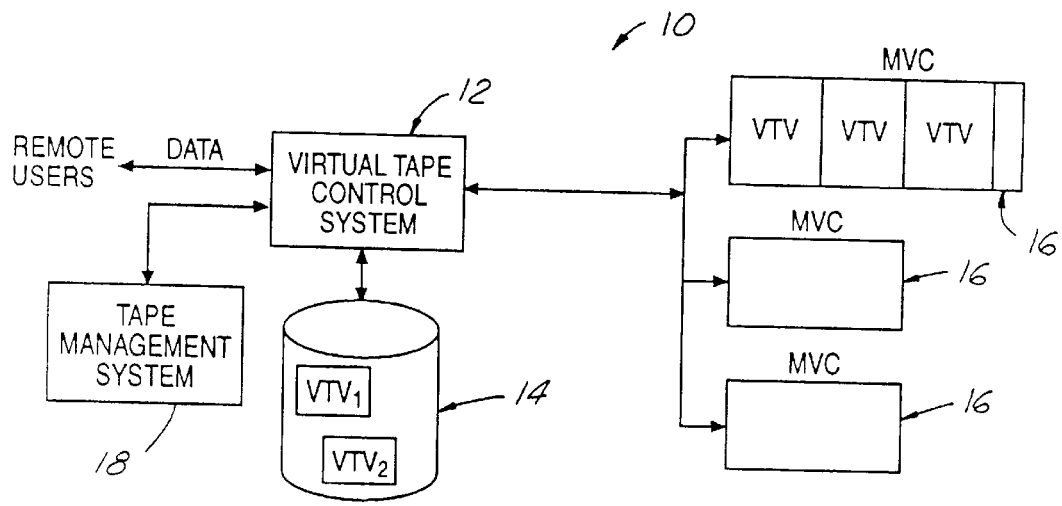
FIG. 1 is a block diagram illustrating a virtual tape system utilizing selective deletion of data corresponding to a scratched virtual volume in accordance with the present invention.

The overall method of the present invention will now be described in connection with FIGS. 1–3. More specifically, a virtual tape system 10 includes a virtual tape control system 12 having a suitable control processor (not shown) for routing all data volume files received from remote users to a disk buffer 14. Virtual tape control system 12 is arranged to transfer data from disk buffer 14 to one or more multiple volume cartridges (MVC) 16 as virtual tape volumes (VTV). A map matching the MVC location with corresponding VTV names and all corresponding file meta data is maintained by the virtual tape control system 12. An external tape management system (TMS) 18 provides overall management of the use of virtual tapes used by virtual tape system 10.

In accordance with the present invention, users can selectively tag or encode any desired data volume file to indicate that the tape and/or disk buffer space occupied by the corresponding virtual volume can be automatically reused either immediately after the expiration date or a predetermined period of time after the expiration date, i.e., a data deletion "grace period." Otherwise, if the user does not expressly designate a data volume file, virtual tape control system 12 will be prohibited from deleting and reusing the space of an expired virtual volume until a user reuses the VTV name for a new file of data.

Figure 2:
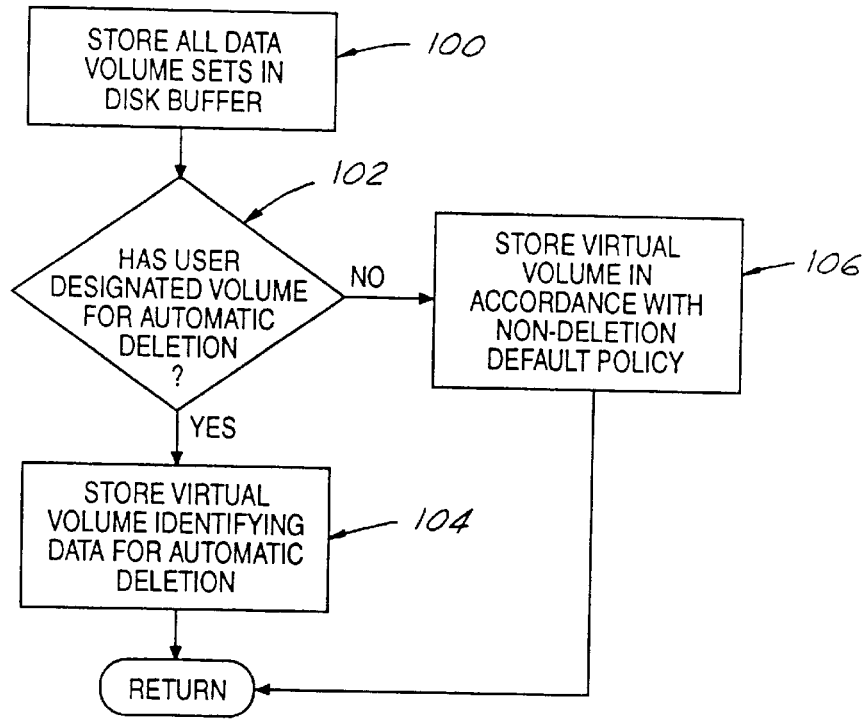
FIG. 2 is a flowchart showing the overall process of the present invention.
Figure 3:
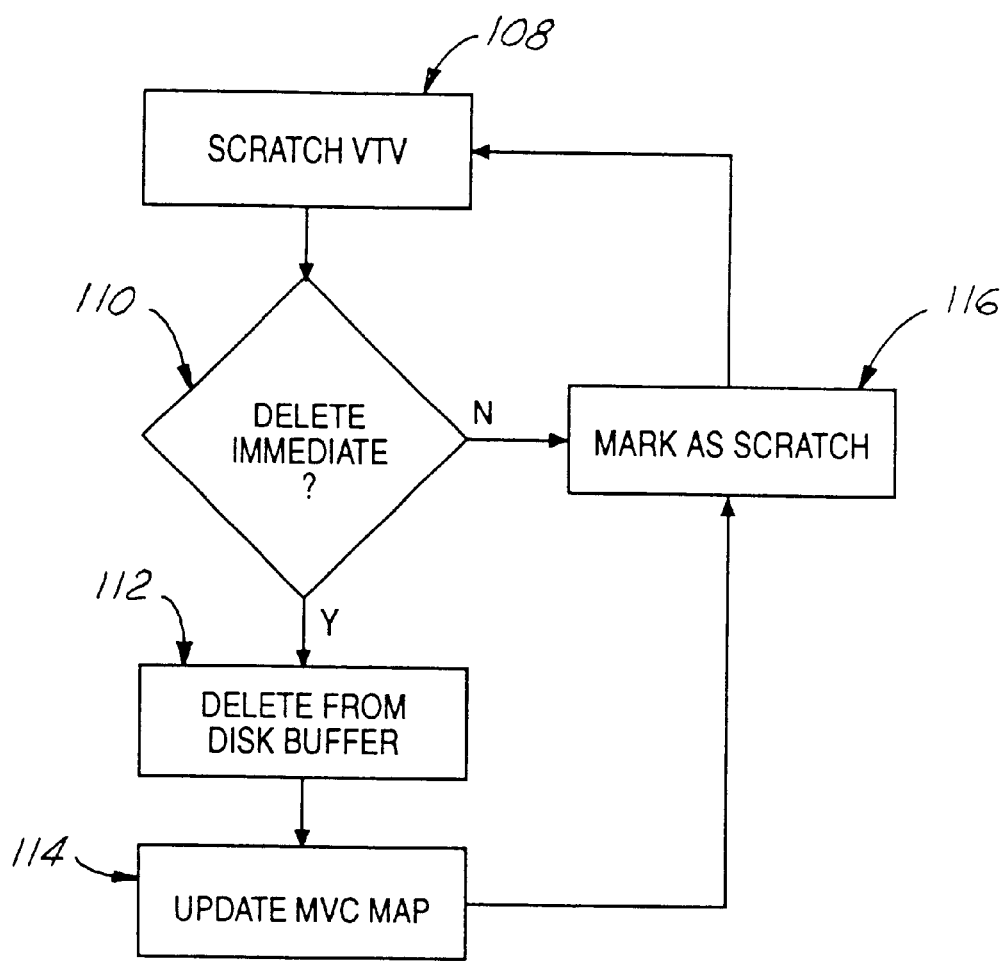
FIG. 3 is a flowchart showing verification and deletion of designated data from a scratch virtual volume.

This process is summarized in the flow charts of FIGS. 2 and 3. As denoted at block 100, all data volume files are stored in the disk buffer, and analyzed at block 102 to determine whether or not the user has designated the corresponding data for immediate deletion at the expiration date, or alternatively after a predetermined or user defined grace period. At block 104, if the data has been designated, the appropriate identifying and mapping information are marked to indicate that the corresponding data can be immediately deleted at either the expiration date or the end of the predetermined grace period. Otherwise, at block 106 the virtual volume is stored in accordance with a default policy which will not allow the virtual tape control system to reuse the tape and disk space occupied by the virtual volume after scratching until that particular virtual volume name is actually reused by the user.

The flowchart of FIG. 3 illustrates an example of automatic deletion of data from a scratch VTV in accordance with the present invention. A VTV which has been selected for scratch at block 108 is analyzed at block 110 to determine whether the VTV has been designated for automatic deletion. If automatic deletion has been identified, the data is deleted from the disk buffer at block 112 (if the data is disk buffer resident), and the MVC map is updated at block 114 to reflect the deletion of the data from the VTV and the space on the physical tape occupied by the virtual volume can be reused. After updating of the MVC map, or if the data had not been identified for automatic deletion at block 110, the virtual volume is marked as scratch at block 116 and therefore reusable. However, the VTV marked for scratch will still contain the data until the VTV is actually reused if the data was not deleted at block 112 or the MVC map was not updated at block 114.

While the present invention has been described as requiring the user to designate whether the data can be automatically deleted to allow bypassing of the default policy of prohibiting such automatic deletion in the absence of a designation, it will be appreciated that the reverse arrangement could be implemented if desired, i.e., the default policy could allow immediate scratched data deletion if an appropriate designation was not made by the user.

Thus, the present invention advantageously provides a method for selectively controlling reutilization of data space in a virtual tape system which allows a user to designate whether a particular scratched data volume can be automatically deleted without any further user action. In this manner, the data deletion safety net provided by conventional tape systems is effectively incorporated into a virtual tape system while also minimizing the impact of such a safety net feature on the overall efficiency in space management provided by the virtual tape system.

While the best mode for carrying out the invention has been described in detail, those familiar with the art to which this invention relates will recognize various alternative designs and embodiments for practicing the invention as defined by the following claims.

What is claimed is:

1. A method for selectively controlling reutilization of data space in a virtual tape system having a disk buffer and at least one multiple volume tape cartridge the method comprising:

a remote user transferring data volume files to the virtual tape system for the virtual tape system to store;

the disk buffer receiving the data volume files transferred by the remote user and then transferring the data making up the data volume files as virtual tape volumes to different locations of the at least one multiple volume tape cartridge for the at least one multiple volume tape cartridge to store;

a remote user selectively designating a particular data volume file for the virtual tape system to automatically delete from storage after a predetermined expiration date included as part of the data volume file has elapsed by automatically deleting the virtual tape volumes corresponding to the particular data volume file designated for automatic deletion from the at least one multiple volume tape cartridge, in order to allow the virtual tape system to automatically reuse the storage space of the at least one multiple volume tape cartridge corresponding to the deleted virtual tape volumes of the particular data volume file designated for automatic deletion without any further action by the user;

detecting if a data volume file received by the disk buffer and transferred by the disk buffer as virtual tape volumes to the at least one multiple tape volume for storage has been designated by the user for automatic deletion; and prohibiting the virtual tape system from automatically deleting the received data volume file from storage after a predetermined expiration date included as part of the received data volume file has elapsed if the received data volume file was not designated by the user for automatic deletion; and allowing the virtual tape system to delete the received data volume file from storage after the predetermined expiration time associated with the received data volume file has expired if the received data volume file was not designated by the user for automatic deletion and if the user reuses the virtual tape volumes of the received data volume file in order for the virtual tape system to store a new data volume file.

2. The method of claim 1 wherein the user selectively tags a particular data volume file before originally transferring to the virtual tape system to indicate that the data volume file is to be automatically deleted.

3. The method of claim 1 wherein if a user has designated a particular data volume file for automatic deletion, determining that the expiration date has passed, and marking the space on a data storage media occupied by the data corresponding to the data volume file to indicate the space can be automatically reused when desired.

4. The method of claim 1 wherein if automatic deletion has been designated, deleting a particular data volume space only after predetermined period of time has passed after the data volume file expiration date.

5. The method of claim 4 further comprising determining that the predetermined period of time has passed, and marking the space on a data storage media occupied by the data corresponding to the data volume file to indicate the space can be automatically reused when desired.

* * * * *